(12) United States Patent
Günther et al.

(10) Patent No.: US 12,092,208 B2
(45) Date of Patent: Sep. 17, 2024

(54) ACTUATING DEVICE FOR AN AUTOMATED MANUAL TRANSMISSION

(71) Applicant: ZF CV Systems Europe BV, Brussels (BE)

(72) Inventors: Michael Günther, Wennigsen (DE); Hans Janzen, Hemmingen (DE); Henning Deiters, Hannover (DE); Rafal Gora, Wroclaw (PL); Damian Kaszuba, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 87 days.

(21) Appl. No.: 18/014,366

(22) PCT Filed: Jul. 6, 2021

(86) PCT No.: PCT/EP2021/068562
§ 371 (c)(1),
(2) Date: Jan. 4, 2023

(87) PCT Pub. No.: WO2022/008467
PCT Pub. Date: Jan. 13, 2022

(65) Prior Publication Data
US 2023/0258263 A1 Aug. 17, 2023

(30) Foreign Application Priority Data
Jul. 8, 2020 (DE) ...................... 10 2020 118 052.7

(51) Int. Cl.
*F16H 61/30* (2006.01)
*F16H 59/02* (2006.01)
*F16H 63/30* (2006.01)

(52) U.S. Cl.
CPC ......... *F16H 61/30* (2013.01); *F16H 59/0204* (2013.01); *F16H 63/3023* (2013.01)

(58) Field of Classification Search
CPC ... F16H 61/30; F16H 63/3023; F16H 59/0204
See application file for complete search history.

(56) References Cited

FOREIGN PATENT DOCUMENTS

| CN | 202708037 U | 1/2013 |
|---|---|---|
| DE | 102004031314 A1 | 1/2006 |

(Continued)

OTHER PUBLICATIONS

European Patent Office, Rijswijk, Netherlands, International Search Report of International Application No. PCT/EP2021/068562, Mailed Oct. 6, 2021, 2 pages.

*Primary Examiner* — Randell J Krug
(74) *Attorney, Agent, or Firm* — Dickinson Wright PLLC (57) ABSTRACT

An actuating device (10) for an automated manual transmission (12) includes a pressure-medium-operated actuator (54) having a piston (58) and a piston rod (64) connectable to the selector element or shift element of the manual transmission. The piston is arranged in a cylindrical receiving chamber (50) of the housing (18) of the actuator and is coaxially movable therein. A sensor system (30) includes a magnet (38) arranged on a holding device (44) and a magnetic-field-sensitive sensor (32) is arranged on the housing radially with respect to the magnet (44). The holding device has a hollow cylindrical geometry, an anti-rotation element (80) is form-lockingly accommodated in an associated recess in the housing (18), and that the anti-rotation element extends across the holding device in the manner of a secant such that rotational movement of the holding device is blocked, although axial and rotational movement of the piston are possible.

20 Claims, 5 Drawing Sheets

(56) References Cited

FOREIGN PATENT DOCUMENTS

| | | | |
|---|---|---|---|
| DE | 202005006878 U1 | 8/2006 | |
| DE | 102005034865 A1 | 2/2007 | |
| DE | 102014011177 A1 | 2/2016 | |
| DE | 102015116654 A1 | 4/2017 | |
| DE | 102016012862 A1 | 5/2018 | |
| DE | 102018003749 A1 | 11/2019 | |
| DE | 102018003751 A1 | 11/2019 | |
| EP | 1602544 A1 | 12/2005 | |
| EP | 3470708 A1 * | 4/2019 | .......... F15B 15/1447 |

* cited by examiner

ACTUATING DEVICE FOR AN AUTOMATED MANUAL TRANSMISSION

CROSS-REFERENCE TO RELATED APPLICATIONS

This application is a 35 U.S.C. § 371 national phase application of International Application No.: PCT/EP2021/068562, filed Jul. 6, 2021, which claims the benefit of priority under 35 U.S.C. § 119 to German Patent Application No.: 10 2020 118 052.7, filed Jul. 8, 2020, the contents of which are incorporated herein by reference in their entirety.

FIELD

The present disclosure relates to an actuating device for an automated manual transmission of a motor vehicle, by which actuating device a selector element or shift element of the manual transmission is movable for setting a shift gate or for engaging or disengaging a gear, wherein the actuating device includes a pressure-medium-operated actuator having a piston and a piston rod, which is connectable to the selector element or shift element of the manual transmission, wherein the piston is arranged in a radially sealed manner in a cylindrical receiving chamber of the housing of the actuating device and is coaxially movable in the receiving chamber, wherein a sensor system that includes a magnet and a magnetic-field-sensitive sensor is provided, and wherein the magnet is arranged on the end face of the piston remote from the piston rod by a holding device and the sensor is arranged radially with respect to the magnet on the housing.

BACKGROUND

DE 10 2005 034 865 A1 describes an adjusting device for a motor vehicle transmission. This adjusting device includes at least one movable adjusting element, the position of which is detected by at least one sensor, wherein a code path is provided, which includes sections having different heights, the sections being designed to be scanned by the sensor. According to the invention, the sections of the code path having different heights are arranged at least two-dimensionally. Preferably, the sections of the code path having different heights are contactlessly scanned by a sensor. A complete mechanical decoupling of this type is advantageous under certain surroundings conditions, such as, for example, in the presence of great temperature fluctuations or strong vibrations. According to this related art, the at least one sensor can be a Hall sensor, which contactlessly interacts with a magnet.

In addition, DE 10 2016 012 862 A1 describes a shift module for an automated manual transmission, the shift module including a box-like module carrier in which an electronic control unit is arranged. Multiple shift rails are axially movably arranged in parallel to a bottom wall of the module carrier facing the transmission interior. A shift fork is secured at each of the shift rails. The shift rails are each operatively connected to a moving part of a gear change cylinder. Moreover, magnetic-field-sensitive position sensors that include a position transmitter on the shift rail and a position detector secured at the housing are provided in order to detect the shift positions of the associated shift rails. In order to increase the accuracy of the detection of the shift position of an associated gear shift sleeve and to reduce the outlay for protecting the position detector and the particular sensor line against contact with transmission oil and against mechanical damage, the position transmitter is attached at the gear shift knob at a close distance to the bottom wall of the module carrier. In addition, the position detector is arranged in a protected manner within the module carrier in the range of motion of the position transmitter on the inside of the bottom wall of the module carrier.

SUMMARY

It is an object of the present disclosure to provide an actuating device, which includes an actuator in the form of a piston-cylinder arrangement, which has a magnet at its moving adjusting element, the magnet acting as part of a sensor system for determining the position of the adjusting element and for determining the position of the transmission element actuated by the adjusting element. Here, according to the present disclosure, it may be ensured that, although the adjusting element can move coaxially to the longitudinal central axis of the actuator and can rotate about this longitudinal central axis, a rotation of the magnet about this longitudinal central axis is prevented.

This solution of the present disclosure is provided an actuating device as described herein. Advantageous enhanced embodiments are defined further herein.

Accordingly, the present disclosure relates to an actuating device for an automated manual transmission of a motor vehicle, by which actuating device a selector element or shift element of the manual transmission is movable for setting a shift gate or for engaging or disengaging a gear, wherein the actuating device includes a pressure-medium-operated actuator having a piston and a piston rod, which is connectable to the selector element or shift element of the manual transmission, wherein the piston is arranged in a radially sealed manner in a cylindrical receiving chamber of the housing of the actuating device and is coaxially movable in the receiving chamber, wherein a sensor system that includes a magnet and a magnetic-field-sensitive sensor is provided, and wherein the magnet is arranged on the end face of the piston remote from the piston rod by way of a holding device and the sensor is arranged radially with respect to the magnet on the housing.

In order to provide the solution of the present disclosure, it is provided that the holding device is connected to the piston such that the piston is rotatable about the longitudinal central axis of the receiving chamber, that the holding device has a hollow cylindrical or a hollow-cylinder-segment-shaped geometry, that a rod-shaped or plate-shaped anti-rotation element is provided, which is form-lockingly accommodated at least with its two ends in an associated recess in the housing, and that the anti-rotation element extends through the hollow cylindrical or hollow-cylinder-segment-shaped holding device in the manner of a secant with slight play and spaced apart from the magnet, such that, although an axial movement and a rotational movement of the piston are possible, a rotational movement of the holding device about the longitudinal central axis of the receiving chamber is prevented.

Accordingly, a self-rotation of the holding device including the magnet arranged on the holding device about the longitudinal central axis of the cylindrical receiving chamber is reliably prevented by way of the anti-rotation element, such that the magnet is always aligned in a precisely positioned manner on the sensor element, which is arranged radially opposite. In addition, the axial displaceability of the holding device including the piston, which is carrying the holding device, is ensured due to the interaction of the holding device and the anti-rotation element, the interaction preferably having a slight amount of play.

The anti-rotation element preferably has a comparatively small overall size and can be cost-effectively manufactured without complex metal-cutting production steps and mounted in the housing of the actuating device. The preferably play-exhibiting arrangement of the anti-rotation element compensates for manufacturing tolerances and avoids the formation of temperature-induced mechanical stresses during operation. The anti-rotation element is also easily integrated into an existing structure by utilizing components that are already present. Moreover, a reduction of wear is also achievable by way of the anti-rotation element.

According to an advantageous embodiment of the actuating device, it is provided that the holding device has two axially extending longitudinal ribs, that the longitudinal ribs each have a planar bearing surface facing in the direction of the anti-rotation element, and that the bearing surfaces are arranged spaced apart from each other along an imaginary secant line of the holding device. The planar and narrow bearing surfaces of the longitudinal ribs effectuate only low frictional forces acting between the holding device and the anti-rotation element, such that a smooth axial displaceability of the holding device and of the piston of the actuating device is ensured.

Moreover, it is preferably provided that the housing of the actuating device is made up of a lower part and an upper part, which are sealed with respect to each other by way of a sealing element. The two-piece design of the housing enables a simple installation of the components of the actuating device.

According to another advantageous embodiment of the actuating device, it is provided that a wall of the lower part of the housing bounding the receiving chamber has at least one retaining pin, which is offset radially outward and points axially in the direction toward the upper part of the housing, that the anti-rotation element has at least one pocket at its side facing the lower part of the housing, and that each retaining pin is accommodated in one associated pocket and rests via the end face against the bottom of the pocket. As a result, a reliable securing-in-place of the anti-rotation element, in particular during its installation, is achieved. The at least one retaining pin preferably has a cylindrical geometry and the at least one pocket preferably has a cup-shaped geometry. A slight mechanical play, for example, is present between the pocket and the retaining pin.

The anti-rotation element preferably has a trapezoidal geometry. As a result, the anti-rotation element is easily and cost-effectively manufacturable. In addition, due to this geometry, a reliable seat of the anti-rotation element in the lower part of the housing of the actuating device is achieved.

Moreover, it is preferably provided that a base side of the anti-rotation element facing the holding device has an axially extending radial indentation, and that a contact surface directed toward the holding device is formed at the anti-rotation element on both sides next to this indentation. The bearing surfaces of the two longitudinal ribs of the holding device can be supported at these two contact surfaces. As a result, a minimization of the mechanical contact surface between the anti-rotation element and the holding device is achieved, as explained further below with reference to an exemplary embodiment.

The anti-rotation element is preferably form-lockingly arranged within a niche-like and approximately trapezoidal recess in the wall of the hollow cylindrical receiving chamber of the housing. As a result, a reliable accommodation of the anti-rotation element in the lateral wall of the housing is achieved.

Moreover, it is preferably provided that the two contact surfaces of the anti-rotation element have at least a slight amount of play and are positioned in parallel with respect to the particular bearing surfaces of the two longitudinal ribs of the holding device. The contact surfaces of the anti-rotation element extend substantially in parallel to the bearing surfaces of the holding device. As a result, a particularly low-friction axial movability and rotation prevention of the holding device for the magnets is achieved.

Preferably, the holding device and the anti-rotation element are made of the same material, such that possible wear debris is prevented from forming.

According to another advantageous embodiment of the present disclosure, it is provided that the sealing element is elastically designed and has at least two domes, which are integrally formed with the sealing element and oriented via their longitudinal extension in parallel to the longitudinal central axis. Despite the approximately knob-like domes, a reliable seal is ensured between the transmission housing and the upper part. The sealing element is preferably designed as a surface seal and made of an elastomeric plastic.

In addition, it can be advantageously provided that the axial length of the two domes of the sealing element is such that, in the mounted condition of the upper part and the lower part of the housing of the actuating device, the anti-rotation element is mechanically axially preloaded by way of these at least two domes against the at least one retaining pin of the lower part of the housing. As a result, the anti-rotation element is reliably prevented from moving, in particular, along with axial displacement movements of the holding device.

Another advantageous embodiment of the actuating device can be such that the at least two domes are connected with the sealing element and positioned by way of a plurality of webs integrally formed with the sealing element. As a result, a reduction of the number of parts of the actuating device and a simplified production and installation of the sealing element are achieved.

In order to implement an easily rotatable connection between the piston and the holding device, it is preferably provided that the holding device has a circular feed-through opening situated radially within, the feed-through opening being delimited in a wall-like manner by an annular shoulder of the holding device. The piston also has an annular collar radially within the holding device and remote from the piston rod, the annular collar extending axially toward the underside of a screw bolt inserted through the feed-through opening. The annular shoulder of the holding device is arranged in the annular open area formed as a result axially between the underside of the screw bolt and the collar of the piston with only a low clamping force.

In addition, it is provided that an axial position of the piston within the hollow cylindrical receiving chamber is contactlessly measurable by way of the sensor system. The aforementioned axial position is, for example, one of the two end positions and a central position in the actuating travel of the piston.

According to another advantageous embodiment of the actuating device, it is provided that the magnetic-field-sensitive sensor is arranged radially outside the wall bounding the hollow cylindrical receiving chamber. As a result, a sealed bore in the wall for accommodating the magnetic-field-sensitive sensor is not necessary.

BRIEF DESCRIPTION OF THE DRAWINGS

The drawings accompany the description herein for a further understanding of the present disclosure. In the drawings.

DETAILED DESCRIPTION

Figure 1:
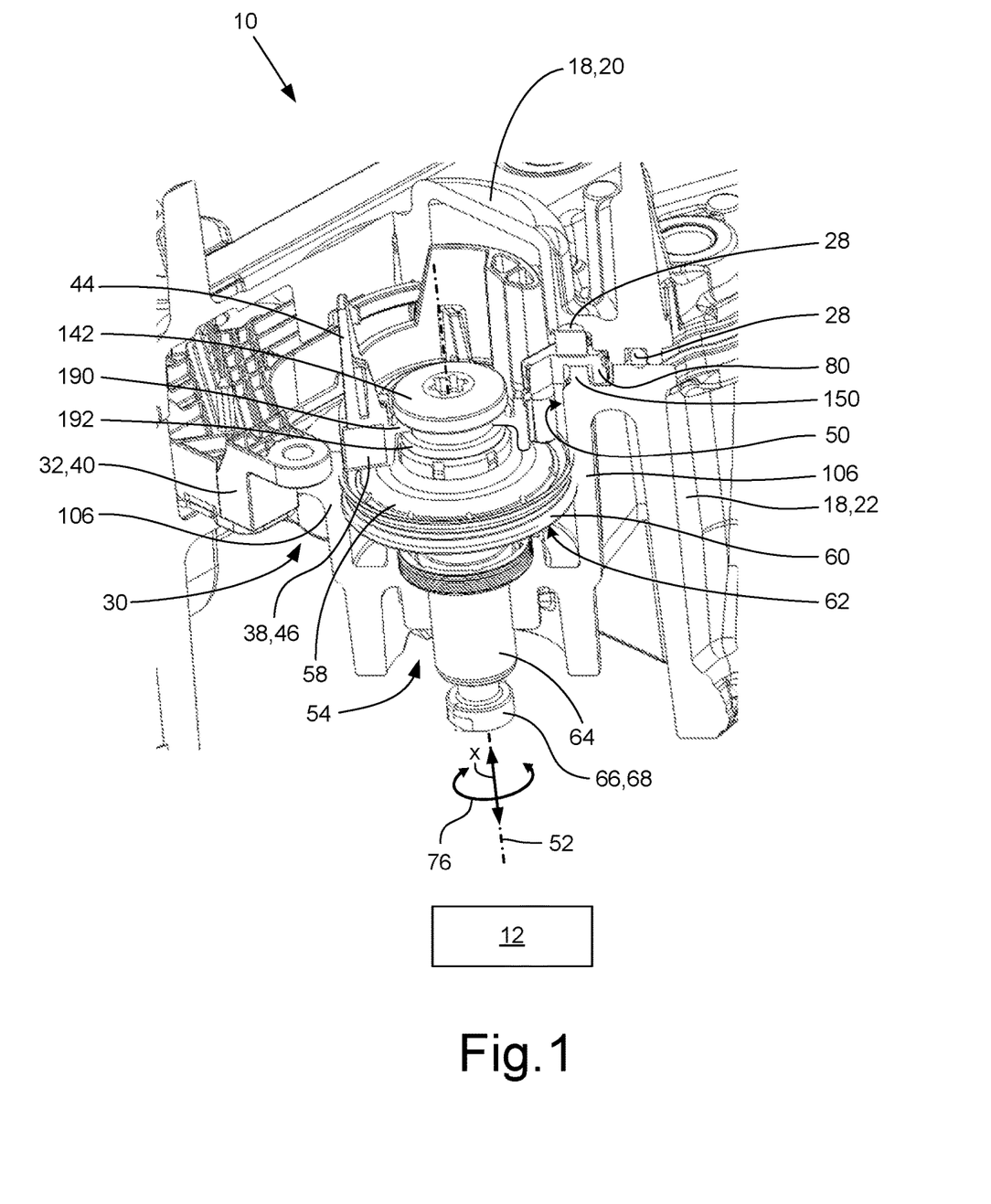
FIG. 1 is a cut perspective partial view of an actuating device according to the present disclosure for an automated manual transmission, the actuating device including a holding device, which is holding a magnet as part of a sensor system, and including an anti-rotation element.

FIG. 1 shows a partially cut perspective partial view of an actuating device 10 for an automated manual transmission 12 of a motor vehicle, the actuating device 10 including a holding device 44 for a magnet 38, which is a component of a sensor system 30. The actuating device 10 has a housing 18 that includes a lower part 22, a cover-like upper part 20, and a sealing element 28 arranged between the lower part 22 and the upper part 20 for fluidically sealing the housing 18 formed from the lower part 22 and the upper part 20.

The actuating device 10 has at least one actuator 54, which is operable by way of pressure medium and is designed as a piston-cylinder arrangement. By way of the final control element of the actuator 54, a shift element or selector element of the manual transmission 12 is actuatable for selecting a shift gate or for engaging or disengaging a gear. This actuator 54 has a hollow cylindrical receiving chamber 50 in the lower part 22 of the housing 18, in which receiving chamber 50 a piston 58 is arranged so as to be movable coaxially with the longitudinal central axis 52 of the receiving chamber 50. The piston 58 is sealed radially outward by way of a circumferential piston seal 60 in a pressure-tight manner with respect to a wall 106 bounding the receiving chamber 50. The piston 58 is preferably manufactured as a shaped sheet-metal part, which is extrusion-coated radially outward with a, for example, elastomeric plastic material for integrally forming the piston seal 60.

A piston rod 64 is secured at the piston underside 62 facing away from the upper part 20 of the housing 18. An interface 68 to the manual transmission 12 is formed at the free end 66 of the piston rod 64. By way of the piston rod 64, which is cylindrical in sections, for example, a selector rod (not represented) is connectable and the selector rod is actuatable for selecting a shift gate. The piston rod 64 can also be connected, however, to a gearshift shaft or shift fork of the manual transmission 12, wherein the gearshift shaft or shift fork is utilized for displacing a gear shift sleeve associated with a gear wheel (not represented) along a transmission shaft. A gear ratio change of the automated manual transmission can be initiated by actuating the gear shift sleeve, as is known to a person skilled in the art from DE 10 2016 012 862 A1.

The aforementioned sensor system 30 is provided for ascertaining the current actuating position of the piston 58, the sensor system 30 including, among other things, a magnetic-field-sensitive sensor 32 and a magnet 38, which is contactlessly operatively connected to the sensor 32. The magnetic-field-sensitive sensor 32 is, for example, a Hall sensor 40 in this case, which is connected by way of connection lines (not represented) to an electronic evaluation electronics system (also not represented) and to a control unit. The magnet 38 is constructionally integrated into the aforementioned holding device 44, which, in this exemplary embodiment, has the circumferential geometry of a hollow cylinder segment. The holding device 44 can also have the geometry of a complete hollow cylinder, however. The holding device 44 is preferably made of a plastic material. The magnet 38 is preferably a permanent magnet 46 shaped as a segment of a circle, which is embedded as one piece into the plastic material of the holding device 44.

By way of the sensor system 30, the axial position X of the piston 58 along the longitudinal central axis 52 of the receiving chamber 50 and, thus, a current shift gate selector state or a shift condition of the manual transmission 12, can be precisely determined. The magnetic-field-sensitive sensor 32 is positioned, by way of example in this case, radially opposite the magnet 38, wherein the magnetic-field-sensitive sensor 32 is arranged radially outside a circumferential wall 106 of the hollow cylindrical receiving chamber 50.

A permanently precise alignment of the magnetic-field-sensitive sensor 32 with respect to the magnet 38 integrated in the holding device 44 is important for ensuring proper measurements. In particular upon engagement of a gear, the piston rod 64 including the piston 58 and the holding device 44 secured at the piston 58 jointly tend to rotate, if not rotationally restricted, about the longitudinal central axis 52, which is indicated in FIG. 1 by the circular first double arrow 76. These rotational movements can adversely affect the measuring accuracy of the sensor system 30. In order to prevent this undesirable effect, according to the present disclosure, a comparatively small anti-rotation element 80 is provided, which interacts with the holding device 44 in such a way that, although an unimpeded coaxial movement of the component assembly made up of the piston rod 64, the piston 58, and the holding device 44 is possible, a rotational movement of the holding device 44 carrying the magnet 38 is prevented in a low-friction manner.

Figure 2:
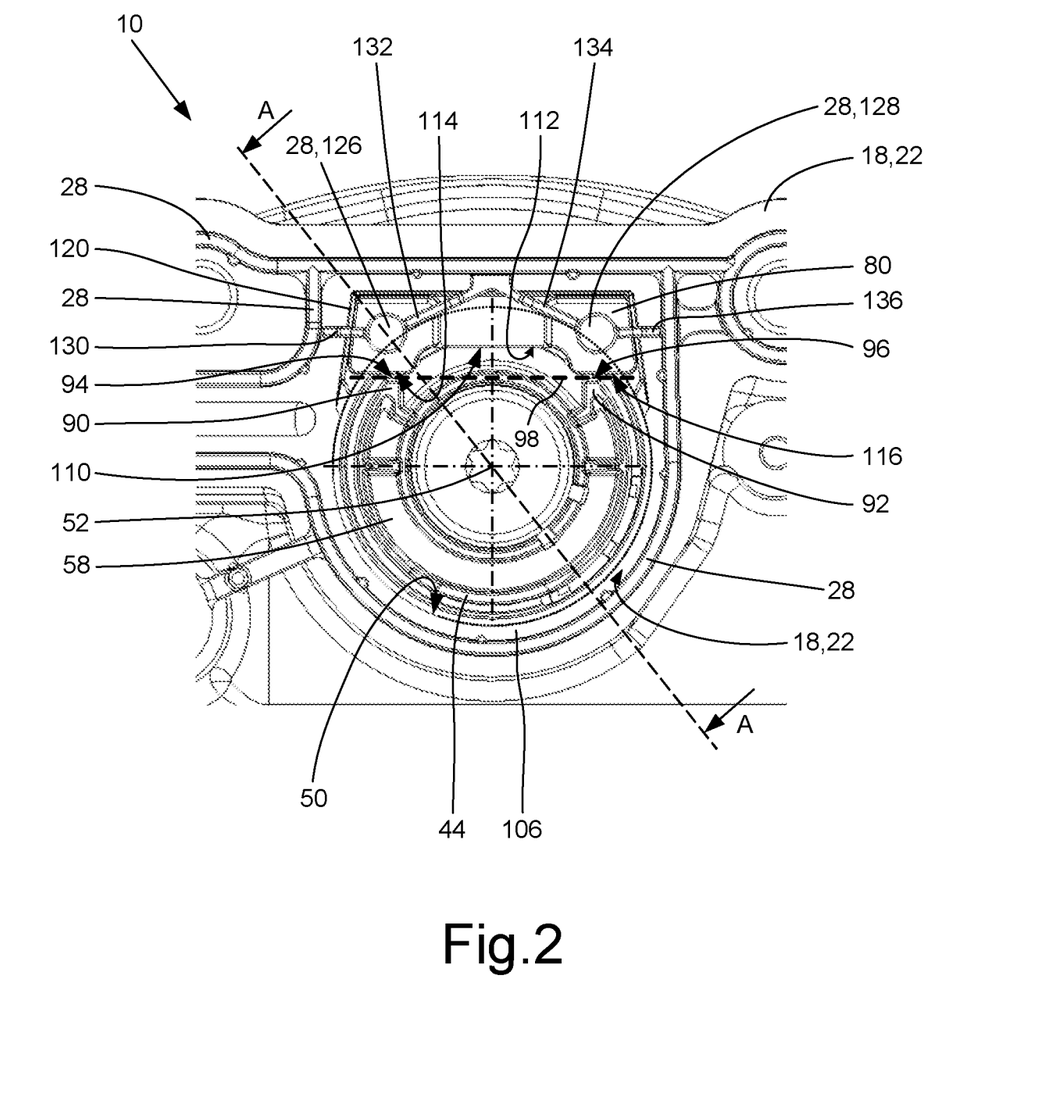
FIG. 2 is a top view of a lower part of a housing of the actuating device, the lower part including a sealing element, and of the holding device arranged within the receiving chamber of the housing, and of the anti-rotation element according to FIG. 1.

FIG. 2 shows an axial top view of the lower part 22 of the housing 18 of the actuating device 10 including the sealing element 28 arranged between the upper part 20 and the lower part 22 of the housing 18, the receiving chamber 50 of the housing 18, the piston 58 arranged in the receiving chamber 50, the holding device 44, which is rotatably secured at the piston 58 remote from the piston rod, and the anti-rotation element 80 interacting with the holding device 44.

The elastomeric sealing element 28, readily apparent in FIG. 2, rests against the lower part 22 of the housing 18 of the actuating device 10. The holding device 44 is connected to the top side of the piston 58 remote from the piston rod so as to be rotatable, if not restricted, about the longitudinal central axis 52 of the receiving chamber 50 and arranged, at least in sections, in the receiving chamber 50, which is bounded by the hollow cylindrical wall 106 of the lower part 22. The holding device 44 has a first axially extending longitudinal rib 90 and a second axially extending longitudinal rib 92, each of which has a planar bearing surface 94, 96, respectively, facing in the direction toward the anti-rotation element 80. The two bearing surfaces 94, 96 extend geometrically along an imaginary secant line 98 at the holding device 44. This secant line 98 geometrically delimits the incomplete cylinder segment section of the holding device 44.

The anti-rotation element 80 has a trapezoidal geometry, by way of example, wherein a base side 110 of the anti-rotation element 80 facing in the direction toward the holding device 44 includes a radial indentation 112 extending axially, i.e., perpendicularly to the plane of the drawing. A radially inward directed first contact surface 114 and a radially inward directed second contact surface 116 are formed next to the indentation 112. The trapezoidal anti-rotation element 80 is arranged in this case in a niche-like recess 120 in the wall 106 of the lower part 22 of the housing 18, the recess 120 being designed geometrically complementary to the anti-rotation element 80 and approximately trapezoidal.

The anti-rotation element 80 can be arranged in the recess 120 in a form-locking manner or with slight play at least in some areas. In the case of a design having slight play, production expenditure is reduced, since a machining operation of the aforementioned components can be dispensed with.

The two contact surfaces 114, 116 of the anti-rotation element 80 are arranged preferably having at least a slight amount of play with respect to the bearing surfaces 94, 96 of the two longitudinal ribs 90, 92. Consequently, clamping effects between the holding device 44 moving coaxially to the longitudinal central axis 52 and the anti-rotation element 80 are avoided.

The holding device 44 and the anti-rotation element 80 are preferably made of the same material, which can be, for example, a plastic material. As a result, material abrasion during the operation of the actuating device is largely avoided.

The sealing element 28 is elastically designed and can be made, for example, of an elastomeric plastic material. The sealing element 28 includes, by way of example in this case, two pin-like domes 126, 128, which are integrally formed with the sealing element 28 and oriented axially, i.e., perpendicularly to the plane of the drawing. The anti-rotation element 80, in the completely mounted condition, is axially clamped between the upper part 20 and the lower part 22 of the housing 18 of the actuating device 10 by way of the two domes 126, 128. This is significant, in particular, for the case in which the anti-rotation element 80 is accommodated with play in the trapezoidal recess 120. The at least two domes 126, 128 are connected as one piece to the sealing element 28 with the aid of a plurality of webs 130, 132, 134, 136 integrally formed at the sealing element 28 and, as a result, are precisely aligned.

Due to the anti-rotation element 80 resting against the secant line 98 of the holding device 44 in some areas, any self-rotation of the holding device 44 is ruled out. Because the holding device 44 is rotatably connected to the piston 58, being rotatable relative thereto, the piston 58 can nevertheless rotate, due to the transmission, about its longitudinal axis or about the longitudinal central axis 52 during an axial movement, which is necessary for engaging a gear. Accordingly, the circumferential orientation of the holding device 44 shown in FIGS. 1 and 2 remains unchanged with respect to the sensor 32 under all operating conditions of the actuating device 10, such that a precise determination of the axial position X of the piston 58 of the actuating device 10 can be carried out by way of the sensor system 30.

Figure 3:
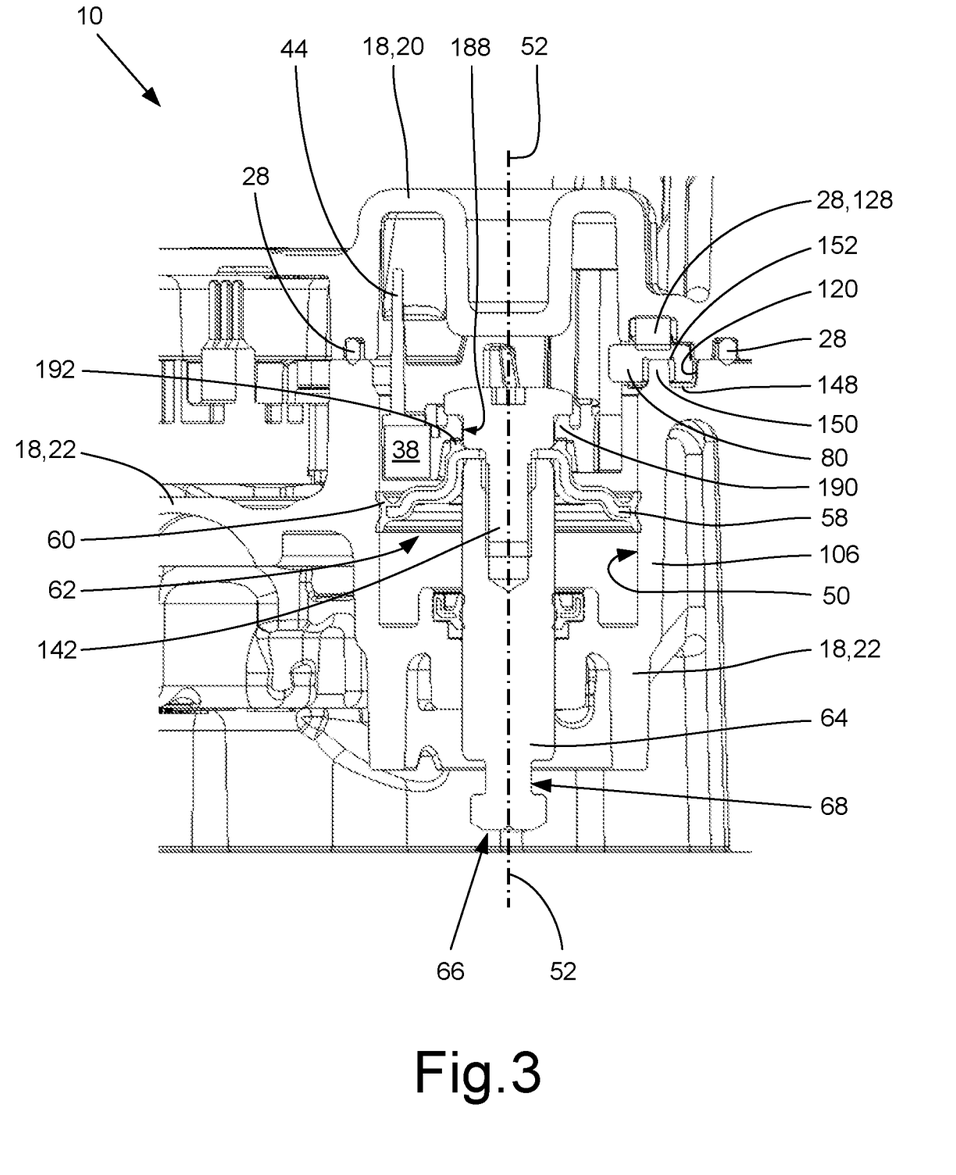
FIG. 3 is a longitudinal section along the section line A-A according to FIG. 2.

FIG. 3 shows a longitudinal section along the section line A-A of FIG. 2. As a result, the receiving chamber 50 of the lower part 22 of the housing 18 of the actuating device 10 bounded by the wall 106 of the lower part 22 of the housing 18 is readily apparent. The piston 58 is accommodated in this receiving chamber 50 so as to be displaceable coaxially to the longitudinal central axis 52 and is guided in a manner sealed by way of the piston seal 60, designed as a double-lip seal by way of example in this case. The seal between the lower part 22 and the upper part 20 of the housing 18 is implemented by way of the sealing element 28, as described above.

The approximately hollow cylindrical or hollow-cylinder-segment-shaped holding device 44 including the magnet 38 integrated at the holding device 44 is arranged, at least in sections, in the receiving chamber 50 of the lower part 22 of the housing 18 and connected to the side of the piston 58 remote from the piston rod, such that the piston 58 is rotatable about the longitudinal central axis 52. The piston 58 is fixedly connected to the piston rod 64 by way of a screw bolt 142. The piston rod 64 includes, at its free end 66 directed away from the piston underside 62, the interface 68 (readily apparent here) for an actuating element of the manual transmission 12 (not represented). This actuating element is, for example, a shift rail for engaging and disengaging gears.

The holding device 44 has a circular feed-through opening 188 situated radially inward, the feed-through opening 188 being delimited in a wall-like manner by an annular shoulder 190 of the holding device 44. The shoulder 190 of the holding device 44 is arranged, with only a comparatively low clamping force, in an annular chamber between the underside of the screw bolt 142 and an annular collar 192 of the piston 58. The collar 192 of the piston 58 is formed radially inward at the piston 58 and extends axially in the direction toward the underside of the screw bolt 142 without reaching the screw bolt 142. The collar 192 is made, for example, of an elastomer injected onto the metal area of the piston 58.

The clamping force with which the holding device 44 is held at the piston 58 is set, on the one hand, to be so great that the holding device 44 is carried along by the piston 58 without play during an axial movement of the piston 58 and, on the other hand, to be so low that the holding device 44 is fixedly held by the anti-rotation element 80 without damage during a rotational movement of the piston 58, i.e., is prevented in a very low-friction manner from also rotating.

The receiving chamber 50 of the housing 18 is radially delimited by the circumferential, substantially hollow cylindrical wall 106, as is also readily apparent in this case. The wall 106 includes, in the area of a bottom surface 148 of the aforementioned recess 120 and situated axially upward and at the top of the recess, at least one cylindrical retaining pin 150, which is offset radially outward and points axially in the direction toward the upper part 20. The anti-rotation element 80 is accommodated on this retaining pin 150 by way of an associated pocket 152 formed on the underside of the anti-rotation element 80 and, among other things, is secured in position as a result.

In the completely mounted condition of the upper part 20 and the lower part 22 of the housing 18 of the actuating device 10 represented in FIG. 3, the anti-rotation element 80 is axially preloaded against the retaining pin 150 by way of the at least two domes 126, 128, of which only one dome 128 is visible in FIG. 3. Consequently, in the case where the anti-rotation element 80 is accommodated with play in the recess 120 of the lower part 22, the anti-rotation element 80 is reliably secured in position with respect to the axial movements of the component assembly made up of the piston 58, the piston rod 64, and the holding device 44 within the receiving chamber 50 coaxially to the longitudinal central axis 52. Therefore, clamping and/or tilting effects, in particular between the anti-rotation element 80 and the holding device 44 for the magnet 38, are ruled out.

In the case where a positive engagement (not represented here) exists, at least in some areas, between the anti-rotation element 80 and the recess 120 of the lower part 22 of the housing 18 of the actuating device 10, an axial preload is not absolutely necessary between the retaining pin 150 of the lower part 22 and the upper part 20 of the housing 18 with the aid of the domes 126, 128 of the sealing element 28.

Figure 4:
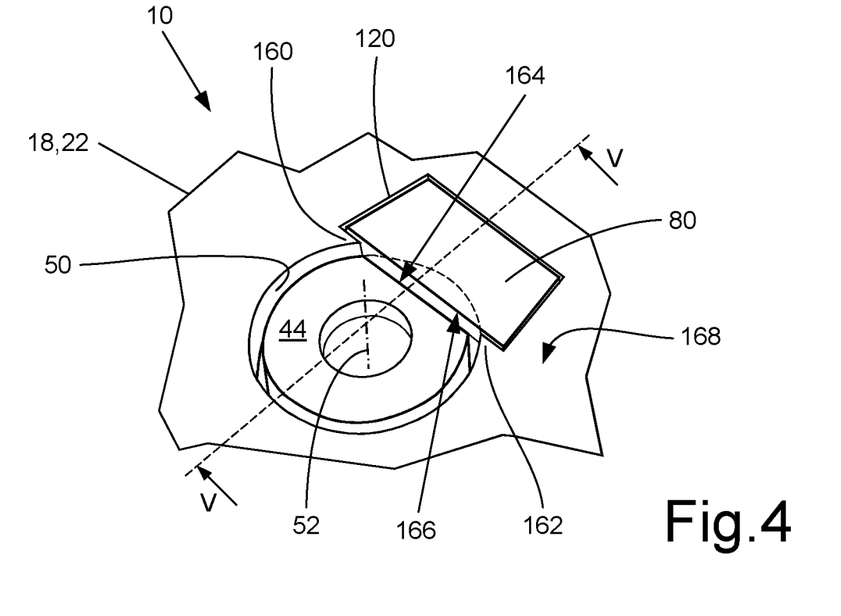
FIG. 4 is a schematic, perspective representation of the holding device and of the anti-rotation element according to FIGS. 1 through 3.

FIG. 4 shows a schematic, perspective representation of the holding device 44 and of the anti-rotation element 80 according to FIGS. 1 through 3. It is also apparent here that the holding device 44 including the magnet 38 (which is not visible in FIG. 4) is accommodated in the receiving chamber 50 of the lower part 22 of the housing 18 of the actuating device 10 and is displaceable axially to the longitudinal central axis 52. The two bearing surfaces 94, 96 of the holding device 44, which rest against the two contact surfaces 114, 116 of the anti-rotation element 80 with play to prevent the holding device 44 from rotating, are represented here in a simplified manner for the sake of greater drawing clarity as end faces 164, 166 extending in parallel to each other. The trapezoidal anti-rotation element 80 is situated, only in areas, by way of example in this case, in a form-locking manner in a similarly trapezoidal recess 120 in the lower part 22 of the housing 18 of the actuating device 10. In addition, the recess 120 in the wall 106 of the lower part 22 of the housing 18 includes, by way of example in this case, two projections 160, 162 directed toward each other, which laterally reach over the end face 166 of the anti-rotation element 80 oriented in the direction toward the holding device 44. Consequently, the anti-rotation element 80 cannot shift in parallel to the top side 168 of the lower part 22 of the housing 18. Rather, the anti-rotation element 80 is largely form-lockingly accommodated in the aforementioned recess 120.

Figure 5:
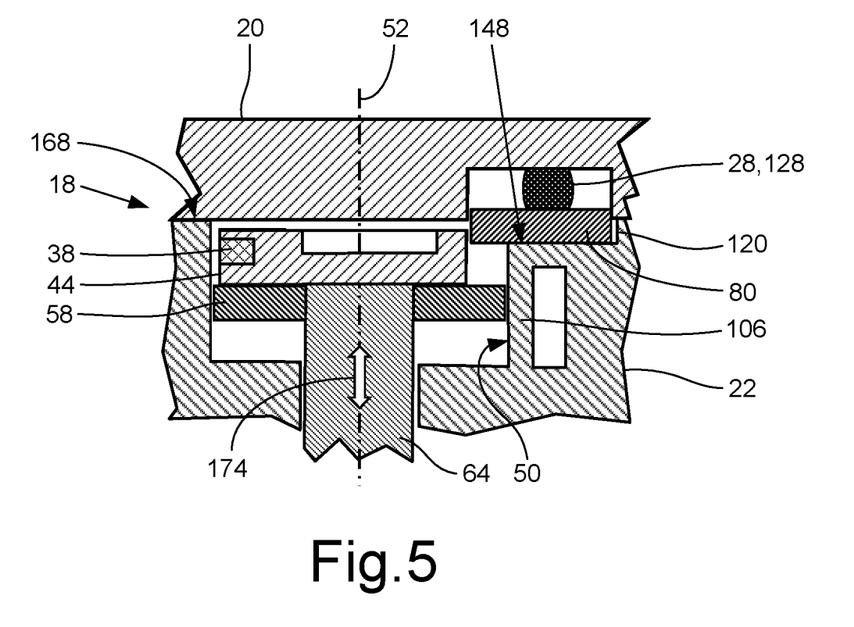
FIG. 5 is a cross-section along the section line V-V according to FIG. 4.

FIG. 5 illustrates a cross-section (represented in a simplified manner) along the section line V-V of FIG. 4. The holding device 44 including the magnet 38 is accommodated in the receiving chamber 50 of the lower part 22 of the housing 18 axially to the longitudinal central axis 52 and coaxially to the direction of the second double arrow 174. The receiving chamber 50 is closed by way of the upper part 20 of the housing 18. The anti-rotation element 80 is accommodated with play in the recess 120 of the lower part 22 of the housing 18 and, thus, can shift at least slightly in parallel to the top side 168 of the lower part 22 of the housing 18. In order to prevent this parallel displaceability, the anti-rotation element 80 is axially clamped between the upper part 20 and the bottom surface 148 of the recess 120 in the lower part 22 of the housing 18 with the aid of the only one visible pin-shaped dome 128 as a component of the sealing element 28. As a result, a reliable securing-in-place of the anti-rotation element 80 in the recess 120 is ensured also during axial movements of the holding device 44 within the receiving chamber 50.

Figure 6:
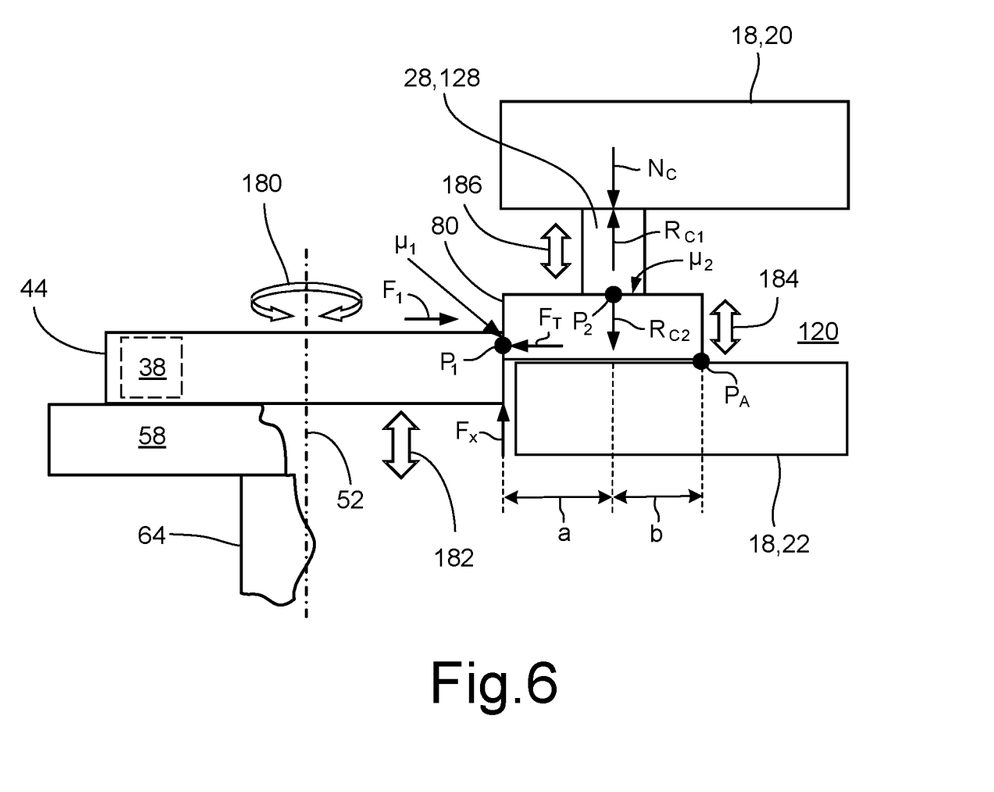
FIG. 6 is a schematic representation of the forces acting on the holding device and on the anti-rotation element according to FIG. 5.

FIG. 6 shows a schematic representation of the forces acting on the holding device 44 and the anti-rotation element 80 according to FIG. 5. The anti-rotation element 80 arranged here in a manner with play is apparent between the upper part 20 and the lower part 22 of the housing 18 and axially clamped by way of the one visible dome 128 (dome 126 not visible in this view) of the sealing element 28. The holding device 44 including the magnet 38, which is arranged on the holding device 44 and is completely extrusion-coated with plastic, strives to rotate together with the piston 58 and the piston rod 64, counter to the effect of the anti-rotation element 80, about the longitudinal central axis 52 according to the rotation arrow 180. In addition, as indicated by the third double arrow 182, the holding device 44 carries out axial movements coaxially to the longitudinal central axis 52. As presented in a simplified manner, a first contact point $P_1$, in the area of which the first sliding friction $\mu_1$ prevails, exists between the holding device 44 and the anti-rotation element 80. In addition, as presented in a simplified manner, a second contact point $P_2$ exists between the dome 128 and the anti-rotation element 80, wherein a second sliding friction $\mu_2$ prevails in this area between the dome 128 and the anti-rotation element 80. Finally, as presented in a simplified manner, a fulcrum $P_A$, about which the anti-rotation element 80 could tilt, exists between the anti-rotation element 80 and the lower part 22 of the housing 18. Due to the axial movement of the holding device 44, the anti-rotation element 80 strives to move upward or downward in the direction of a fourth double arrow 184, which results in a compression movement of the elastic dome 128 in the direction of the fifth double arrow 186.

Upon contact with the anti-rotation element 80, the holding device 44 acts with a horizontal force $F_1$ oriented perpendicularly to the longitudinal central axis 52 on the anti-rotation element 80, such that an opposite and equal counter force $_T$ acts at the first contact point $P_1$. The upper part 20 of the housing 18 presses with a normal force $N_C$ acting parallel to the longitudinal central axis 52 on the dome 128 of the sealing element 28, which induces an equal and oppositely directed normal reaction force $R_{C1}$ there. A compressive force $R_{C2}$ is imparted as a result via the dome 128 of the sealing element 28, the compressive force $R_{C2}$ acting at the point P2 perpendicularly onto the anti-rotation element 80 and, with respect to its absolute value, is equal to the normal force $N_C$.

An undesirable tilting force $F_x$ arising due to the upwardly and downwardly directed axial movements of the holding device 44 is defined as $F_x = F_1 * \mu_1$, which is therefore proportional to the magnitude of the horizontal force $F_1$ and the sliding friction $\mu_1$ between the holding device 44 and the anti-rotation element 80.

A first lever length "a" exists between the first contact point $P_1$ and the second contact point $P_2$, and a second lever length "b" extends between the second contact point $P_2$ and the fulcrum $P_A$. The inequality $F_x(a+b) < R_{C2} * b$ must be satisfied in order to ensure that an anti-rotation element 80 that is accommodated in the recess 120 of the lower part 22 of the housing 18 with play is also reliably secured in position despite the axial movements of the holding device 44. This means that a torque formed from the product of the tilting force $F_x$ and the sum of the two lever lengths a+b must always be less than the torque formed from the product of the compressive force $R_{C2}$ or the normal force $N_C$ with the second lever length b. Thus, the compressive force $R_{C2}$ built up by the dome 128, by the upper part 20, and by the lower part 22 of the housing 18 and acting on the anti-rotation element 80 must always be greater than the tilting force $F_x$.

The compliance with the inequality can be substantially ensured by way of an appropriate material section for setting the two sliding frictions $\mu_1, \mu_2$, by way of the selection of an elastomeric plastic having a suitable elasticity for the at least one dome 128, and by way of an appropriate axial mechanical clamping or preloading of the dome 128.

LIST OF REFERENCE CHARACTERS 10 actuating device for an automated manual transmission
12 automated manual transmission
18 housing of the actuating device
20 upper part of the housing
22 lower part of the housing
28 sealing element
30 sensor system
32 magnetic-field-sensitive sensor
38 magnet
40 Hall sensor
44 holding device for the magnet
46 permanent magnet
50 receiving chamber in the lower part of the housing
52 longitudinal central axis
54 actuator
58 piston
60 piston seal
62 piston underside
64 piston rod
66 free end of the piston rod
68 interface
76 first double arrow
80 anti-rotation element
90 first axial longitudinal rib of the holding device
92 second axial longitudinal rib of the holding device
94 first bearing surface of the holding device
96 second bearing surface of the holding device
98 secant line of the holding device
106 wall of the receiving chamber
110 base side of the anti-rotation element
112 indentation in the anti-rotation element
114 first contact surface of the anti-rotation element
116 second contact surface of the anti-rotation element
120 recess in the lower part of the housing
126 first dome
128 second dome
130 first web
132 second web
134 third web
136 fourth web
142 screw bolt
148 bottom surface of the recess
150 retaining pin
152 pocket in the anti-rotation element
160 first projection
162 second projection
164 end face of the holding device
166 end face of the anti-rotation element
168 top side of the lower part of the housing
174 second double arrow
180 rotation arrow
182 third double arrow
184 fourth double arrow
186 fifth double arrow
188 feed-through opening of the holding device
190 annular shoulder of the holding device
192 annular collar of the piston
a first lever length
b second lever length
$N_C$ normal force
$R_{C1}$ reaction force (normal force)
$R_{C2}$ compressive force
$F_1$ horizontal force
$F_T$ counter force
$F_X$ tilting force
$P_1$ first contact point
$P_2$ second contact point
$P_A$ fulcrum
$\mu_1$ first sliding friction
$\mu_2$ second sliding friction
X axial position of the piston

What is claimed is:

1. An actuating device (10) for an automated manual transmission (12) of a motor vehicle, wherein a selector element or shift element of the automated manual transmission is movable by the actuating device (10) for setting a shift gate or for engaging or disengaging a gear, the actuating device (10) comprising:

a housing (18) having a cylindrical receiving chamber (50),
a pressure-medium-operated actuator (54) having a piston (58) and a piston rod (64),
wherein the piston rod (64) is connectable to the selector element or shift element of the manual transmission,
wherein the piston (58) is arranged in a radially sealed manner in the receiving chamber (50) of the housing (18) of the actuating device (10) and is coaxially movable in the receiving chamber (50),
a sensor system (30) including a magnet (38) and a magnetic-field-sensitive sensor (32),
wherein the magnet (38) is arranged on an end face of the piston (58) remote from the piston rod (64) by a holding device (44),
wherein the sensor (32) is arranged radially with respect to the magnet (38) on the housing,
wherein the holding device (44) is connected to the piston (58) such that the piston is rotatable about a longitudinal central axis (52) of the receiving chamber (50),
wherein the holding device (44) has a hollow cylindrical or a hollow-cylinder-segment-shaped geometry,
wherein a rod-shaped or plate-shaped anti-rotation element (80) having two ends is form-lockingly accommodated at least with the two ends in an associated recess (120) in the housing (18), and
wherein the anti-rotation element (80) extends across the holding device (44) in the manner of a secant with play and spaced apart from the magnet (38), wherein the piston (58) is moveable axially and rotationally,
wherein a rotational movement of the holding device (44) about the longitudinal central axis (52) of the receiving chamber (50) is prevented.

2. The actuating device as claimed in claim 1, wherein the holding device (44) has two axially oriented longitudinal ribs (90, 92), wherein the longitudinal ribs (90, 92) each have a planar bearing surface (94, 96) facing in the direction of the anti-rotation element (80), and that the bearing surfaces (94, 96) are arranged spaced apart from each other along an imaginary secant line (98) of the holding device (44).

3. The actuating device as claimed in claim 1, wherein the housing (18) includes a lower part (22) and an upper part (20), which are sealed with respect to each other by a sealing element (28).

4. The actuating device as claimed in claim 3, wherein a wall (106) of the lower part (22) of the housing (18) bounding the receiving chamber (50) has at least one retaining pin (150), which is offset radially outward and points axially in the direction toward the upper part (20) of the housing (20), wherein the anti-rotation element (80) has at least one pocket (152) at a side facing the lower part (22) of the housing (18), and wherein each retaining pin (150) is accommodated in one associated pocket (152) and rests via an end face against a bottom of the pocket (152).

5. The actuating device as claimed in claim 1, wherein the anti-rotation element (80) has a trapezoidal geometry.

6. The actuating device as claimed in claim 5, wherein a base side (110) of the anti-rotation element (80) facing the holding device (44) has an axially extending radial indentation (112), and that a contact surface (114, 116) directed radially inward is formed at the anti-rotation element (80) on both sides next to the indentation.

7. The actuating device as claimed in claim 5, wherein the anti-rotation element (80) is form-lockingly arranged within a trapezoidal recess (120) in a wall (106) of the hollow cylindrical receiving chamber (50).

8. The actuating device as claimed in claim 6, wherein the contact surfaces (114, 116) of the anti-rotation element (80) have at least an amount of play and are positioned in parallel with respect to the particular bearing surfaces (94, 96) of the longitudinal ribs (90, 92) of the holding device (44).

9. The actuating device as claimed in claim 5, wherein the holding device (44) and the anti-rotation element (80) are made of the same material.

10. The actuating device as claimed in claim 4, wherein the sealing element (28) is elastic and includes at least two domes (126, 128) integrally formed therewith and oriented with a longitudinal extension of the domes in parallel to the longitudinal central axis (52).

11. The actuating device as claimed in claim 10, wherein an axial length of the two domes (126, 128) of the sealing element (28) is such that, in the mounted condition of the upper part (20) and the lower part (22) of the housing (18) of the actuating device (10), the anti-rotation element (80) is mechanically preloaded by way of the at least two domes (126, 128) axially against the at least one retaining pin (150) of the lower part (22) of the housing (18).

12. The actuating device as claimed in claim 10, wherein the at least two domes (126, 128) are formed with the sealing element (28) and positioned by way of a plurality of webs (130, 132, 134, 136) integrally formed in the sealing element (28).

13. The actuating device as claimed in claim 1, wherein the holding device (44) includes a circular feed-through opening (188) situated radially within and being delimited in a wall-like manner by an annular shoulder (190) of the holding device (44).

14. The actuating device as claimed in claim 13, wherein the piston (58) includes an annular collar (192) situated radially within the holding device (44) and remote from the piston rod (64), the annular collar (192) extending axially toward an underside of a screw bolt (142) inserted through the feed-through opening (188) without reaching the screw bolt (142), and wherein the annular shoulder (190) of the holding device (44) is arranged axially between the underside of the screw bolt (142) and the collar (192) of the piston (58).

15. The actuating device as claimed in claim 1, wherein an axial position (X) of the piston (58) within the hollow cylindrical receiving chamber (50) is contactlessly measurable by way of the sensor system (30).

16. The actuating device as claimed in claim 1, wherein the magnetic-field-sensitive sensor (32) is arranged radially outside a wall (106) bounding the hollow cylindrical receiving chamber (50).

17. The actuating device as claimed in claim 1, wherein the holding device (44) is rotatable relative to the receiving chamber (50) when the anti-rotation element (80) is removed.

18. The actuating device as claimed in claim 14, wherein the annular collar (192) of the piston (58) is in the form of an elastomer applied onto a metal portion of the piston (58).

19. The actuating device as claimed in claim 1, wherein the piston (58) includes an elastomeric annular seal (60) applied onto a metal portion of the piston (58) and arranged in a sealing manner with the receiving chamber (50).

20. The actuating device as claimed in claim 1, wherein a compressive force built up by at least two domes (126, 128), the upper part (20), and the lower part (22) acting on the anti-rotation element is greater than an opposite tilting force applied to the anti-rotation (80) element by friction caused by axial movement of the holding device (44) relative to the anti-rotation element.

\* \* \* \* \*